Jan. 12, 1960 H. L. COOKE 2,921,136
TRANSFLUXOR SYSTEM
Filed Oct. 31, 1955 2 Sheets-Sheet 1

INVENTOR.
HARRY L. COOKE
BY
Carl V. Olson
ATTORNEY

INVENTOR.
HARRY L. COOKE
BY
Carl V. Olson
ATTORNEY

United States Patent Office 2,921,136

Patented Jan. 12, 1960

2,921,136

TRANSFLUXOR SYSTEM

Harry L. Cooke, Princeton, N.J., assignor to Radio Corporation of America, a corporation of Delaware Application October 31, 1955, Serial No. 543,893

7 Claims. (Cl. 179—15)

This invention relates to a transfluxor system for translating sequential signals, and more particularly to a time division multiplex receiver terminal wherein a plurality of sequentially appearing intelligence modulated signals are translated to time over-lapping signals on separate leads, and are then translated to continuous simultaneous intelligence signals on separate leads.

In time division multiplex communications systems, a pulse train is transmitted which includes one pulse sample of each of a plurality of messages during each cycle of the pulse train. The pulses are arranged in time sequence. At the receiving terminal, an electronic distributor directs the sequential pulses to separate channels wherein the signals are demodulated to recreate the respective messages.

The intelligence modulated pulses directed to a given channel are of short duration compared with the space between the pulses. For example, if time is equally allotted to twenty-four message channels, the duration of each pulse in a given channel must be less than 1/24 of the time between the pulses in the given channel. Consequently, after demodulation, a much greater amount of audio amplification must be provided at the receiver than would be required for a continuous signal of the same amplitude. It is therefore an object of this invention to provide an improved transfluxor arrangement in each channel of a time division pulse multiplex receiver to effectively prolong each pulse until just before the following pulse is received so that much less audio frequency amplification is required.

The principles of time division pulse multiplex communications are also employed in other fields such as the telemetering, instrumentation, telegraph and computing machine fields where a plurality of sequential signals are translated to an equal plurality of simultaneous signals on separate leads. It is therefore another object of this invention to provide an improved means for translating sequential signals to signals of prolonged duration on separate leads.

A system illustrative of the invention includes a source of a pulse train wherein successive pulses have amplitude corresponding with instantaneous values of respective separate channel message signals such as audio signals. Pulses corresponding with a given message channel recur frequently enough so that the message signal can be recreated by detection. The pulses of the pulse train are distributed by an electronic distributor to a plurality of separate channel leads each corresponding with one message channel. One transfluxor is provided for each channel. Each transfluxor includes a core of magnetic material having a rectangular hysteresis loop and provided with two apertures. A reset coil, a set coil, an A.-C. coil and an output coil are wound thru the apertures. Each output of the electronic distributor is coupled to the set coil of one transfluxor and to the reset coil of another transfluxor, the arrangement being such that the pulse of each channel sets the corresponding transfluxor and resets the transfluxor corresponding with the next following channel. A source of alternating current is coupled to the A.-C. coils of all transfluxors, and individual detectors are coupled to the output coils of the respective transfluxors to provide separate channel message output signals. The output signals have relatively high amplitude because each narrow pulse applied to a transfluxor results in a long duration output signal from the transfluxor.

For a better understanding of the invention, reference is made to the following more detailed description taken in conjunction with the appended drawings, wherein.

Figure 1:
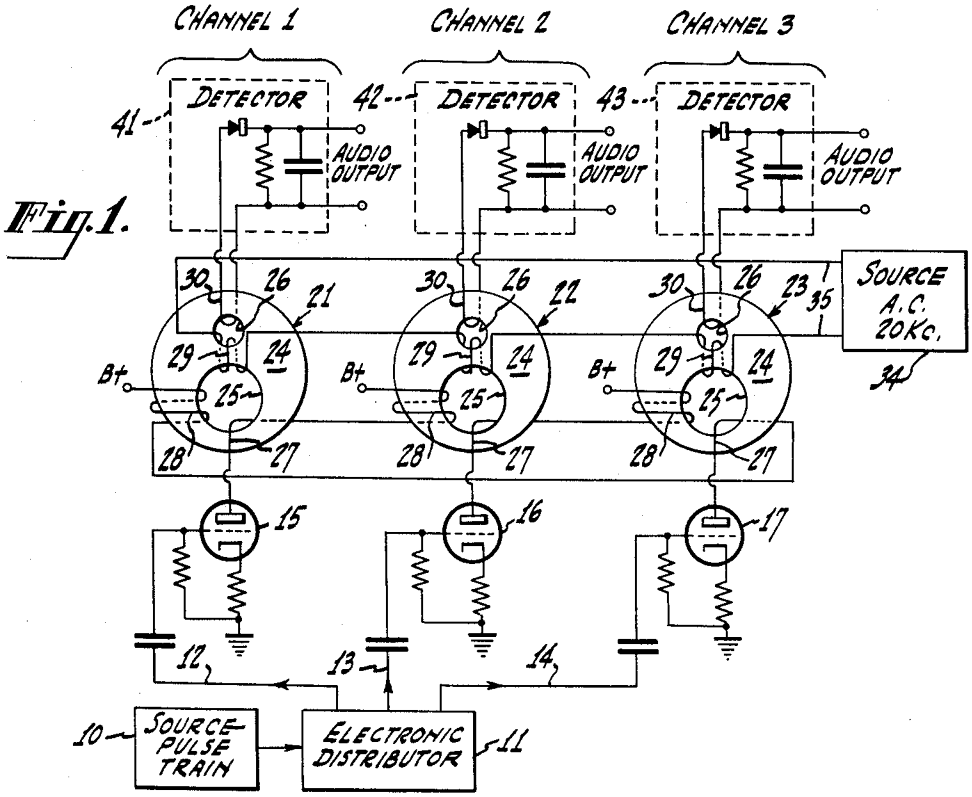
Figure 1 is a diagram of a time division pulse multiplex receiving terminal of a three-channel system illustrative of the invention.
Figures 3A, 3B, 3C, 3D, 3E, 3F:
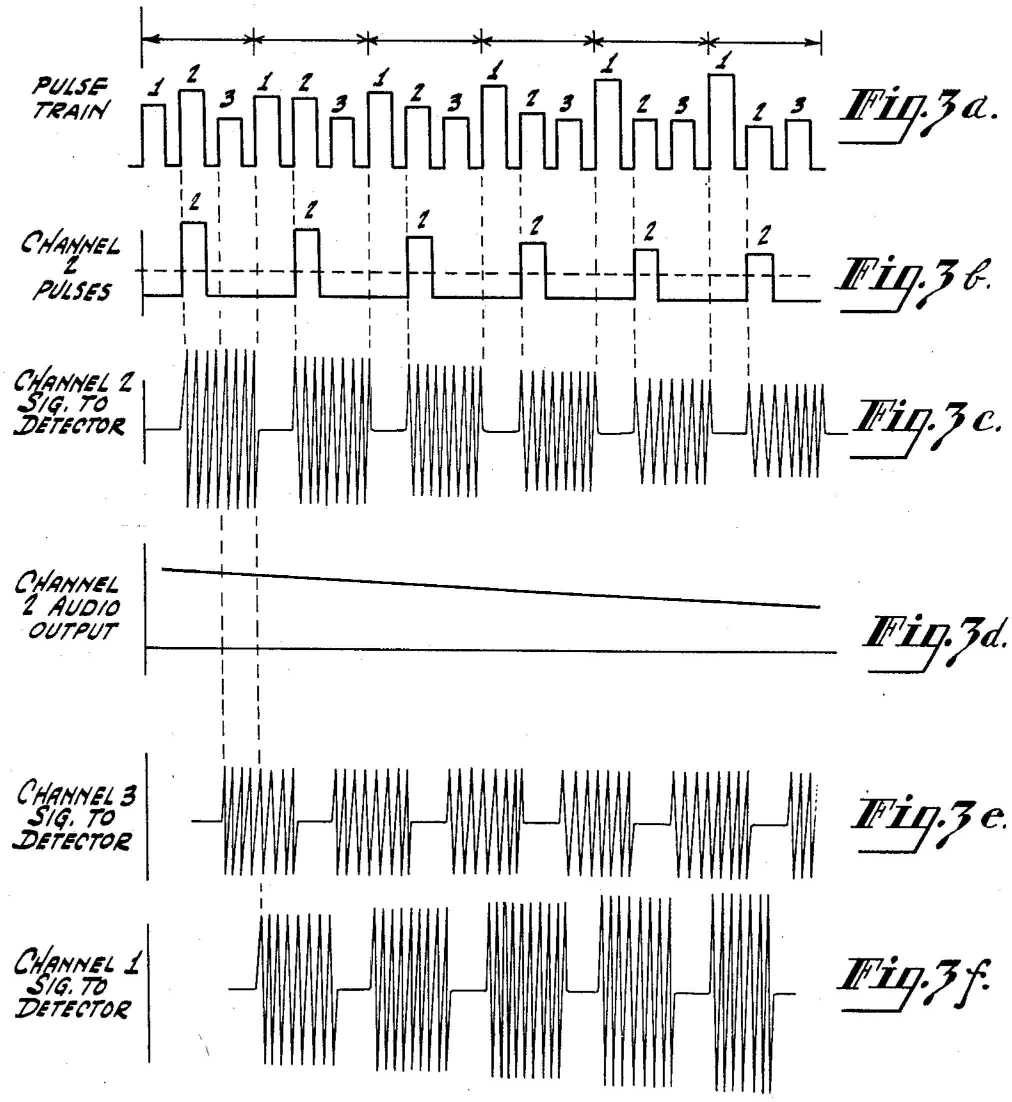
Figures 3*a* thru 3*f* are charts representing voltage waveforms at various designated points in the system of Figure 1.

In Figure 1 the invention is illustrated as applied to a three-channel time division multiplex receiving terminal. It will be understood that in practice a much larger number of channels will normally be provided. The output of the source 10 of a pulse train whose successive pulses are relatively modulated in amplitude may have an appearance of the waveform shown in Figure 3*a* of the drawings. This waveform is normally obtained at the receiving terminal by demodulating a received radio frequency carrier signal received from the remote transmitting terminal of a time division pulse multiplex system. The output of the pulse train source 10 is applied to an electronic distributor 11 which switches pulses of the pulse train to three separate channel output leads 12, 13 and 14 corresponding with the three signal channels of the system. The waveform on the lead 13 corresponding with channel 2 may be as shown in Figure 3*b* of the drawings. The leads 12 and 14, in similar manner, carry the pulses of channels 1 and 3, respectively, which are time displaced relative to the pulses in channel 2. The channel leads 12, 13 and 14 are coupled to the control electrodes of vacuum tubes 15, 16 and 17, respectively. Magnetic devices in the form of transfluxor units 21, 22 and 23 are provided for channels 1, 2 and 3, respectively. Each transfluxor unit includes a disc-shaped core 24 having a large aperture 25 and a small aperture 26 therein. The core 24 is made of a magnetic material having a rectangular hysteresis loop characteristic. The transfluxor cores 24 may be molded from a powder-like manganese magnesium ferrite and annealed at a suitable high temperature to obtain the desired magnetic characteristics. Certain other ceramic-type magnetic materials, and certain metallic materials such as Mo-Permalloy, may be employed if desired. Suitable magnetic materials are known in the art as those characterized by substantial saturation at remanence, i.e., after a magnetizing force has been removed.

Each transfluxor unit includes a set coil 27, a reset coil 28, an A.-C. (alternating current or control) coil 29, and an output coil 30. These coils are represented in the drawing as consisting of one or two turns around a leg of the core 24 formed by the apertures 25 and 26. It will be understood that a greater number of turns may be necessary or desirable. The reset coil 28 is shown in the drawings as having two turns, and the set coil 27 is shown as having one turn, for the purpose of illustrating the fact that the reset coil 28 should have a larger number of turns than the set coil 27. The locations of the coils 27, 28, 29 and 30 as shown in the drawing are presently preferred locations for the respective coils.

The anode circuit of vacuum tube 15 in channel 1 includes the set coil 27 of transfluxor unit 21 and the reset coil 28 of transfluxor unit 22. The anode circuit of vacuum tube 16 in channel 2 includes the set coil 27 of the transfluxor unit 22 and the reset coil 28 of the transfluxor unit 23. Similarly, the anode circuit of the vacuum tube 17 in channel 3 includes the set coil 27 of transfluxor unit 23 and the reset coil 28 of transfluxor unit 21. In each case the anode circuit is completed from the anode of the respective vacuum tube thru the two coils to the positive or B+ terminal of a source of uni-directional potential.

A source 34 of alternating current, which may be at a frequency of 20 kilocycles, has an output 35 connected to all of the A.-C. coils 29 arranged in series. The frequency of the A.-C. source 34 should be sufficiently high with relation to the maximum frequency of the intelligence or message modulation in the channels to permit demodulation of the message signals. The usual rule is that the frequency of a carrier wave should be at least two and one-half and preferably three or four times the highest modulating frequency. The A.-C. source 34 should preferably be a very low impedance source.

The output coils 30 of the transfluxor units 21, 22 and 23 are connected to respective detectors 41, 42 and 43, in channels 1, 2 and 3, respectively. The detector circuits are conventional circuits for the purpose of deriving modulation from an alternating current carrier. Other types of utilization circuits may be substituted for the detectors in the system of Figure 1. The outputs of the detectors provide audio frequency signals which may be applied to loud speakers to reproduce the audio messages originally present at the transmitting terminal. It will, of course, be understood that the intelligence signals are not necessarily limited to audio frequency signals but may be more complex signals including higher frequency components.

Figure 2:
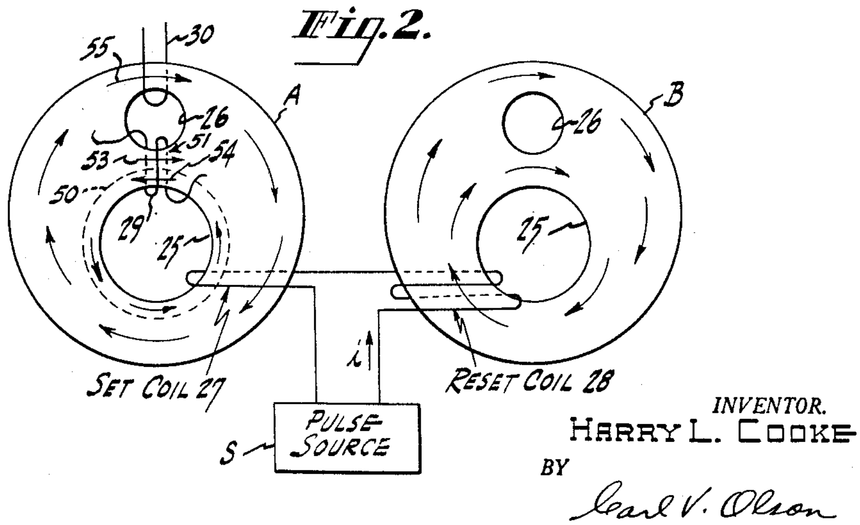
Figure 2 is a diagram which will be referred to in explaining the operation of transfluxor units in the system of Figure 1.

Before describing the operation of the system of Figure 1, reference will be made to Figure 2 for a description of the operation of transfluxor units included in the system. Figure 2 shows two transfluxor cores A and B each having apertures 25 and 26. A pulse source S has an output connected thru a reset coil 28 on core B and a set coil 27 on the core A. The pulse source S corresponds with the output on one of the leads 12, 13 and 14 from the electronic distributor 11 in Figure 1 after passing thru the respective ones of the vacuum tubes 15, 16 and 17.

A pulse from the source S is applied thru the reset coil 28 of the transfluxor B to saturate the core with flux in the directions indicated by the arrows. The number of turns in the reset coil 28 is made sufficiently large so that a pulse of minimum amplitude is sufficient to saturate the core. Once the core is saturated, no greater amount of flux can be established regardless of the amplitude of the current in a magnetizing coil.

The pulse from the source S also goes thru the set coil 27 of the transfluxor A. However, the set coil 27 on the core of transfluxor A is wound in a direction opposite from the direction in which the reset coil 28 of transfluxor B is wound. Therefore, the pulse from the source S tends to magnetize the transfluxor A in the opposite direction compared with the direction of magnetization in transfluxor B. If the transfluxor A is assumed to have been previously magnetized to saturation in the direction shown in transfluxor B, the effect of the pulse current in the set coil 27 of the transfluxor A is to reverse a portion of the previously existing flux. The characteristics of the magnetic core material in the transfluxor is that it tends to have all portions thereof magnetically saturated in one direction or the other. Therefore, the effect of the pulse flowing thru the set coil 27 in the transfluxor A is to reverse the direction of the flux in the area surrounding the aperture 25 and extending outward to the dotted circle 50. The remainder of the core remains saturated in the original direction. The amplitude of the pulse from the source S passing thru the set coil 27 determines the size of the circle 50 within which the flux is reversed. If the pulse is of very low amplitude, no flux reversal will take place. If the pulse is of very high amplitude, the region within which the flux is reversed may be so large that all the flux in that portion 51 of the core between the two apertures is reversed in direction. Pulses having intermediate amplitudes between the two extremes produce proportionate amounts of flux reversal in the portion 51 of the core between the apertures 25 and 26.

The remaining original flux in the portion 51 of the transfluxor A is represented by the arrow 53, and the reversed flux is represented by the arrow 54. The original flux at the opposite side of the apeture 26 is represented by the arrow 55. It will be noted that the arrows 54 and 55 have directions circling the aperture 26 in a clockwise direction. Therefore, the flux 54 and a portion of the flux 55 constitutes a closed flux loop surrounding the aperture 26. This closed flux loop goes thru the A.-C. coil 29 and thru the output coil 30. Since the closed flux loop goes thru both coils, it is possible to apply an A.-C. signal to coil 29 and derive an A.-C. signal from the output coil 30 by transformer action. The amplitude of the A.-C. signal obtained from the output coil 30 depends on the amount of flux in the closed loop coupling both coils. The amount of flux in the closed loop surrounding the aperture 26 depends on the size of the portion of the core within the dotted circle 50 in which the flux direction has been reversed by the pulse passed thru the set coil 27. It is therefore apparent that with a constant amplitude A.-C. signal applied to the A.-C. coil 29, the amplitude of the A.-C. signal derived from the output coil 30 will depend on the amplitude of the pulse previously passed thru the set coil 27.

During one half cycle of the alternating current applied to A.-C. coil 29, the amount of flux in the direction 54 is increased and the amount of flux in the direction 53 is decreased; and during the other half cycle the amount of flux in the direction 54 is decreased and the amount of flux in the direction 53 is increased. Therefore, the amount of flux 54 in the closed loop linking both coils 29 and 30 varies in a sinusoidal manner about a level established by the previously applied pulse thru the set coil 27. The inverse sinusoidal variations in the amounts of flux 53 and 54 is believed to result from variations in the cross-sectional areas thru which fluxes in the two directions exist. In other words, every point in the core except for a narrow dividing zone is believed to be substantially saturated with flux in one direction or the other. For a better explanation of the operation of a halftone transfluxor, reference is had to the article, "The Transfluxor—A Magnetic Gate with Stored Variable Setting" by J. A. Rajchman and A. W. Lo in the June 1955 issue of the RCA Review.

Now referring to the operation of the system of Figure 1, a channel 2 pulse from vacuum tube 16 is applied thru the reset coil 28 of transfluxor 23 and thru the set coil 27 of the transfluxor 22. The transfluxor 23 is thus reset to the saturated condition represented by core B of Figure 2, and the transfluxor 22 is set to a condition as represented by the core A in Figure 2. It will be understood that the transfluxor 22 was previously reset by the channel 1 pulse from the vacuum tube 15. The alternating current applied to the coil 29 in the transfluxor 22 from the source 34 causes an alternating current to be induced in the output coil 30 and having an amplitude determined by the amplitude of the set pulse applied thru the set coil 27. The A.-C. signal induced in the output coil 30 of transfluxor 22 continues during and after the channel 2 pulse and until the transfluxor 22 is reset by a channel 1 pulse flowing thru the reset winding 28 of the transfluxor 22. The channel 2 pulse is represented in Figure 3*b* of the drawings, and the A.-C. signal in the output coil 30 of transfluxor 22 is represented in Figure 3*c* of the drawings. The A.-C. signal from the output coil 30 is applied to the detector 42 to provide an audio frequency as represented in Figure 3*d* of the drawings. Figure 3*d* shows a very small portion of the audio frequency signal which fluctuates in amplitude at an audio frequency rate.

A channel 3 pulse from vacuum tube 17 follows the channel 2 pulse. The channel 3 pulse passes thru the set winding 27 of the transfluxor 23 and the reset coil 28 of the transfluxor 21. An audio frequency output is obtained from the detector 43 from the beginning of the channel 3 pulse until the transfluxor 23 is reset by the next following channel 2 pulse. In a similar manner, the channel 1 pulse from the vacuum tube 15 provides an audio frequency output from the detector 41 until such time as the transfluxor 21 is reset by the next following channel 3 pulse. It will be noted that the transfluxor units 21, 22 and 23 are connected in a ring so far as the input pulses are concerned. The A.-C. output from the output coil 30 of transfluxor 23 is as represented in Figure 3*e* of the drawings; and the A.-C. signal from the output coil 30 of the channel 1 transfluxor 21 is represented in Figure 3*f* of the drawing.

It is apparent that according to this invention an A.-C. signal is provided in each channel which has a much longer duration than the initiating pulse, and that each transfluxor is reset by the pulse of the preceding channel so that it is ready to receive the next pulse of the channel to which it is assigned. While the invention has been illustrated as applied to a three-channel time division pulse multiplex system, wherein the channel pulse is effectively prolonged about 3 times, it will be understood that proportionately greater prolongation of the effective signal is achieved in systems arranged for handling a greater number of channels. The effective prolongation of the channel signals results in a proportionately increased audio output amplitude compared with the amplitude obtained by merely detecting the channel pulses themselves.

What is claimed is:

1. A multi-channel time division pulse multiplex receiving terminal comprising, a source of a pulse train wherein successive channel pulses correspond in amplitude with a plurality of intelligence signals, a distributor having an input coupled to the output of said source and having a separate output for each of said channel pulses, a separate magnetic device associated with each of said channels, each device including an apertured core and a set coil, a reset coil, a control coil, and an output coil on said core, means to apply each of said outputs from said distributor to the set coil on the core of the corresponding device and to the reset coil on the core of the device associated with the distributor output providing the next following pulse, a source of alternating current coupled to said control coils, and individual detectors coupled to said output coils.

2. An arrangement for translating relatively short duration sequentially appearing pulses to longer duration time overlapping signals comprising, a plurality of apertured magnetic cores each having a set coil by which the core can be made to assume one condition, a reset coil by which the core can be made to assume a second condition, a control coil and an output coil, means for individually connecting the set coil on each core in series with the reset coil on another core, whereby said cores are all intercoupled through their set and reset coils and arranged for operation in time sequence, means for individually and sequentially supplying pulses to the respective set coils of the different cores in the order in which said cores are arranged, whereby the application of a pulse to the set coil on one core results in the resetting of the next operating core, means for applying an alternating current to said control coils, and output means connected to said output coils and responsive to the time overlapping signals produced by said cores.

3. An arrangement for translating amplitude modulated pulses supplied sequentially from separate sources to audio frequency signals comprising, first, second and third apertured magnetic cores each having a set coil by which the core can be made to assume one condition, a reset coil by which the core can be made to assume a second condition, a control coil and an output coil, means for individually connecting the set coil on each core in series with the reset coil on another core, whereby said cores are all intercoupled through their set and reset coils and arranged for operation in time sequence, means for individually and sequentially applying amplitude modulated pulses supplied by a plurality of separate sources to the respective set coils on the different cores in the order in which said cores are arranged, whereby the application of a pulse to the set coil on one core results in the resetting of the next operating core, means for connecting said control coils in series and to a source of alternating current, and detectors each connected to one of said output coils for converting the time overlapping signals produced by said cores into audio frequency signals.

4. An arrangement for translating relatively short duration pulses supplied sequentially from separate sources to longer duration time overlapping signals comprising, first, second and third magnetic cores each having two apertures of different sizes therein spaced apart by the material of said cores, a set coil by which the core can be made to assume one condition, a reset coil by which the core can be made to assume a second condition, a control coil and an output coil on each of said cores, said set coil and said reset coil passing through the larger of said apertures, said output coil passing through the smaller of said apertures and said control coil passing through both of said apertures, means for individually connecting the set coil on each core in series with the reset coil on a second one of said cores, whereby said cores are all intercoupled through their set and reset coils and arranged for operation in time sequence, means for individually and sequentially applying pulses supplied by a plurality of separate sources to the respective set coils on the different cores in the order in which said cores are arranged, whereby the application of a pulse to the set coil on one core results in the resetting of the next operating core having a set coil to which the next following pulse supplied by said sources is applied, means for connecting said control coils in series and to a source of alternating current, and output means connected to said output coils and responsive to the time overlapping signals produced by said cores.

5. An arrangement for translating relatively short duration pulses sequentially supplied from separate sources to longer duration time overlapping signals comprising, first, second and third apertured magnetic cores each having a set coil by which the core can be made to assume one condition, a reset coil by which the core can be made to assume a second condition, a control coil and an output coil; first, second and third pulse sources arranged and operated to supply pulses sequentially in that order, only one of said sources supplying a pulse at a time, means to apply the pulses from said first source to the set coil on said first core and the reset coil on said second core, means to apply the pulses from said second source to the set coil on said second core and the reset coil on said third core, means to apply the pulses from said third source to the set coil on said third core and the reset coil on said first core, whereby all but one of said cores are set in said one condition at any given time, means to connect said control coils in series and to a source of alternating current, and means connected to said output coils and responsive to the time overlapping signals produced by said cores during the periods in which said cores are in said one condition.

6. An arrangement as claimed in claim 5 and wherein said cores each include two apertures of different sizes spaced apart by the material of said cores, said reset and set coils passing through the larger of said apertures, said output coil passing through the smaller of said apertures and said control coil passing through both of said apertures.

7. A multi-channel time division pulse multiplex receiving terminal as claimed in claim 1 and wherein said cores each include two apertures of different sizes spaced apart by the material of said cores, said reset and set coils passing through the larger of said apertures, said output coil passing through the smaller of said apertures and said control coil passing through both of said apertures.

References Cited in the file of this patent

UNITED STATES PATENTS

| | | |
|---|---|---|
| 2,519,513 | Thompson | Aug. 22, 1950 |
| 2,685,644 | Toulon | Aug. 3, 1954 |
| 2,729,807 | Paivinen | Jan. 3, 1956 |
| 2,802,953 | Arsenault et al. | Aug. 13, 1957 |
| 2,803,812 | Rajchman et al. | Aug. 20, 1957 |
| 2,816,169 | Pawley | Dec. 10, 1957 |

OTHER REFERENCES

"Magnistor Circuits" (Snyder), published in "Electronics Design," August 1955, pp. 24–27.